US010440145B1

United States Patent
Torun

(10) Patent No.: US 10,440,145 B1
(45) Date of Patent: Oct. 8, 2019

(54) SDK FOR REDUCING UNNECESSARY POLLING OF A NETWORK SERVICE

(71) Applicant: Amazon Technologies, Inc., Seattle, WA (US)

(72) Inventor: Mustafa Ugur Torun, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 15/263,747

(22) Filed: Sep. 13, 2016

(51) Int. Cl.
*H04L 29/08* (2006.01)
*H04L 12/26* (2006.01)

(52) U.S. Cl.
CPC .............. *H04L 67/32* (2013.01); *H04L 43/10* (2013.01); *H04L 67/26* (2013.01); *H04L 67/2842* (2013.01)

(58) Field of Classification Search
CPC ......... H04L 67/32; H04L 67/26; H04L 43/10; H04L 67/2842
See application file for complete search history.

(56) References Cited

U.S. PATENT DOCUMENTS

| 2008/0167910 | A1* | 7/2008 | De Marcken | G06Q 10/02 705/5 |
| 2011/0282980 | A1* | 11/2011 | Kumar | G06F 9/505 709/223 |
| 2013/0170348 | A1* | 7/2013 | Luna | H04L 47/20 370/230.1 |
| 2014/0279112 | A1* | 9/2014 | Ulrich | G06Q 20/322 705/21 |
| 2018/0060572 | A1* | 3/2018 | Singleton | G06F 21/53 |

* cited by examiner

*Primary Examiner* — Michael A Keller
(74) *Attorney, Agent, or Firm* — Lee & Hayes, P.C.

(57) ABSTRACT

A software development kit (SDK) is disclosed that can reduce unnecessarily polling of a network service. The SDK is modified to cache response objects received from a network service that describe the state of a computing resource. Polling requests received for the state of the computing resource are satisfied from the cache when possible, thereby avoiding the polling of the network service. Entries in the cache can be invalidated based upon events generated by the network service that indicate that the state of the computing resource has changed.

20 Claims, 9 Drawing Sheets

SDK FOR REDUCING UNNECESSARY POLLING OF A NETWORK SERVICE

BACKGROUND

Polling is a commonly used mechanism for obtaining data from network services. For example, an application can utilize polling to regularly determine the state of a network service or the state of a computing resource provided by the network service. Polling, however, can be very inefficient and, as a result, can unnecessarily utilize network bandwidth and computing resources. If the state of the polled network service or the computing resource provided by the network service does not change between polls of the network service, for instance, an unnecessary polling operation has been performed, thereby wasting network bandwidth and computing resources. Heavy polling can also place a significant load on the polled network service, which is usually undesirable. In response thereto, the polling application can be throttled by blocking requests from the polling application in some circumstances, which is also typically undesirable.

Event-based delivery mechanisms are one alternative to polling that can reduce unnecessary polling of a network service. When an event-based delivery mechanism is utilized, polling can be eliminated by only providing notifications when events that identify a change in the state of the network service. Although event-based delivery mechanisms can reduce some of the unnecessary use of computing resources caused by polling, these mechanisms can be difficult to implement, particularly with programs that have been configured to utilize polling. Developers of such programs typically do not want to expend the significant time and effort necessary to convert a program that utilizes polling to instead utilize an event-based delivery mechanism. This can be especially true for programs that are large and complex.

The disclosure made herein is presented with respect to these and other considerations.

DETAILED DESCRIPTION

Figure 1A:
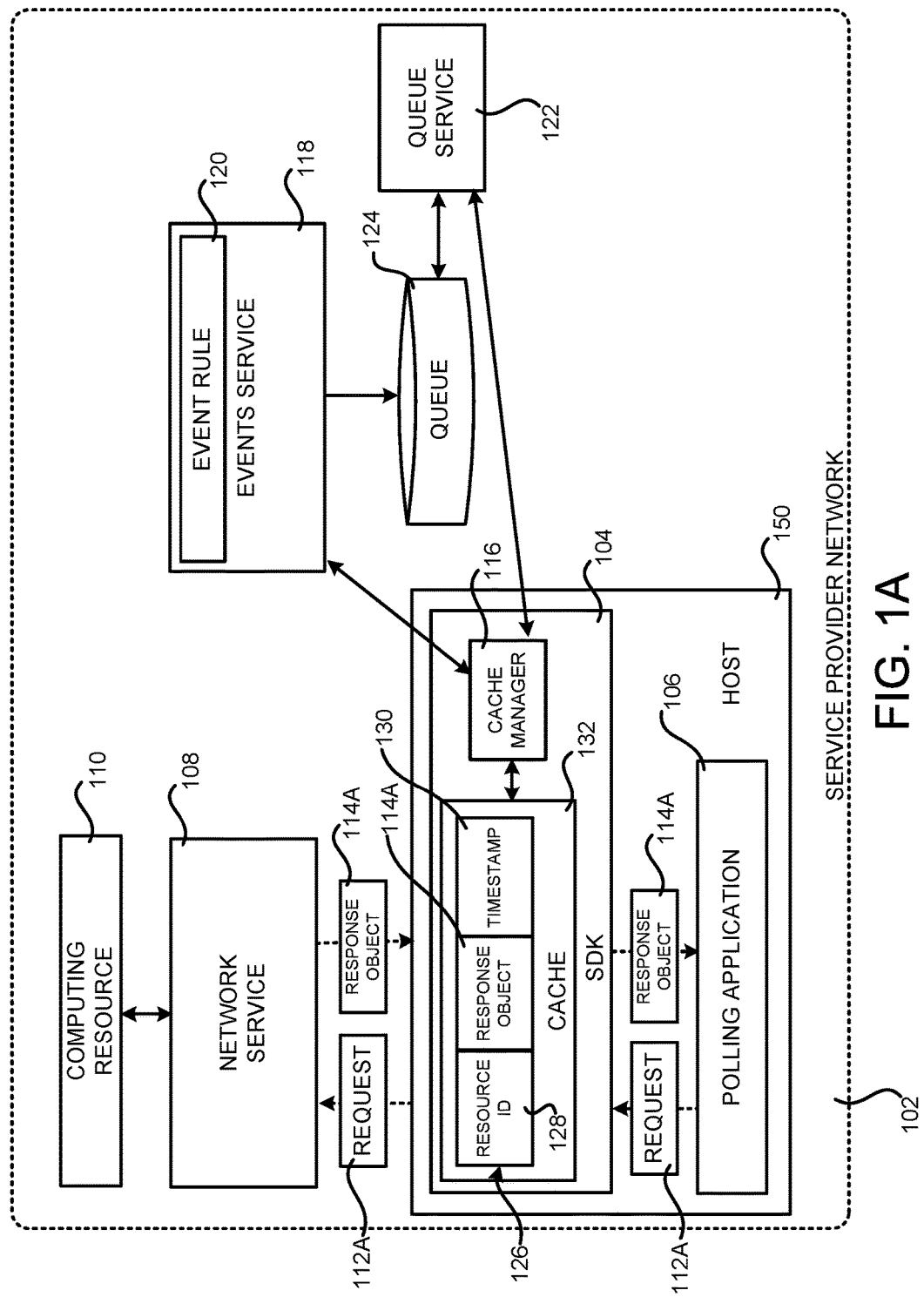
FIGS. 1A and 1B are system architecture diagrams showing aspects of the configuration and operation of a service provider network that is configured to provide a software development kit ("SDK") that reduces unnecessary polling of a network service, according to one particular configuration.

The following detailed description is directed toward technologies for providing a software development kit ("SDK") that reduces unnecessary polling of a network service. Through an implementation of these technologies, the volume of unnecessary polling of a network service performed by an application (which might be referred to herein as a "polling application") can be significantly reduced by making only minor changes to the application. For example, and without limitation, it might only be necessary to change references in the program to a method exposed by the SDK in order to modify an application program to utilized the mechanism disclosed herein. As a result, significant savings of network bandwidth and computing resource utilization can be obtained with little effort on the part of the developer of the application. The disclosed technologies can also reduce the load placed on network services that are heavily polled and, potentially, reduce the throttling of polling applications. Technical benefits other than those specifically identified herein can be realized through an implementation of the disclosed technologies.

According to one particular configuration disclosed herein, an SDK is provided that facilitates utilization of network services executing in a service provider network. For example, the SDK can expose functionality for serializing requests made to network services by a polling application and de-serializing responses received from the network services. The SDK can also provide other types of functionality including, but not limited to, format conversion, encryption and decryption, providing application programming interfaces ("APIs") for accessing network services, managing transfers, and buffering. The SDK can provide other types of functionality in other configurations.

The SDK can also provide functionality for reducing unnecessary polling of a network service. In particular, the SDK can receive a request to poll a network service in a service provider network from a polling application. The request might, for example, be a request to obtain information describing the current state of a computing resource provided by the network service. When such a request is received, the SDK can determine if a response object that describes the state of the computing resource is contained in a cache maintained by the SDK. If the response object is included in the cache, the SDK can respond to the request from the polling application with the response object without polling the network service.

If, however, the response object is not stored in the cache, the SDK can poll the network service to obtain the requested response object and provide a reply to the request that includes the response object obtained from the network service. The SDK can also create an entry in the cache that includes the response object. The entry in the cache can also include other information including, but not limited to, a resource identifier ("ID") that uniquely identifies the computing resource and a timestamp indicating the creation time of the entry.

The SDK can also communicate with a network service executing in the service provider network to create a destination for events relating to the computing resource. For example, and without limitation, the SDK can communicate with a queue service executing in the service provider network to create a queue for storing events relating to the computing resource. Additionally, the SDK can communicate with an events service, also executing in the service provider network, to create an event rule. As discussed in greater detail below, the event rule causes the events service to place an event in the destination (e.g. the queue) when the state of the computing resource changes.

The network service can also generate events to the events service in response to determining that the state of the computing resource has changed. The events service will receive the event and determine if the event matches an event rule. If so, the event service will place the event in the destination (e.g. the queue) specified by the event rule. The events service, the SDK, or another service, can also delete the event rule after a predetermined period of time has elapsed following the creation of the event rule. In a similar fashion, the SDK, or another service, can also delete the queue 124.

The SDK can also periodically poll the destination (e.g. the queue) to determine if an event corresponding to the computing resource has been stored in the destination. If such an event has been stored in the destination (e.g. placed on the queue), the SDK will retrieve the event from the destination (e.g. dequeue the event from the queue) and invalidate the entry in the cache that includes the response object relating to the computing resource. In this manner, entries in the cache can be invalidated when the state of the corresponding computing resource changes. This will cause the SDK to poll the network service for updated information regarding the state of the computing resource the next time the polling application submits a polling request. The SDK can also invalidate entries in the cache based upon the timestamp. In this manner, entries in the cache can be periodically invalidated even if entries are late or are not received from the events service. Additional details regarding the various components and processes described briefly above will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like.

As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1B:
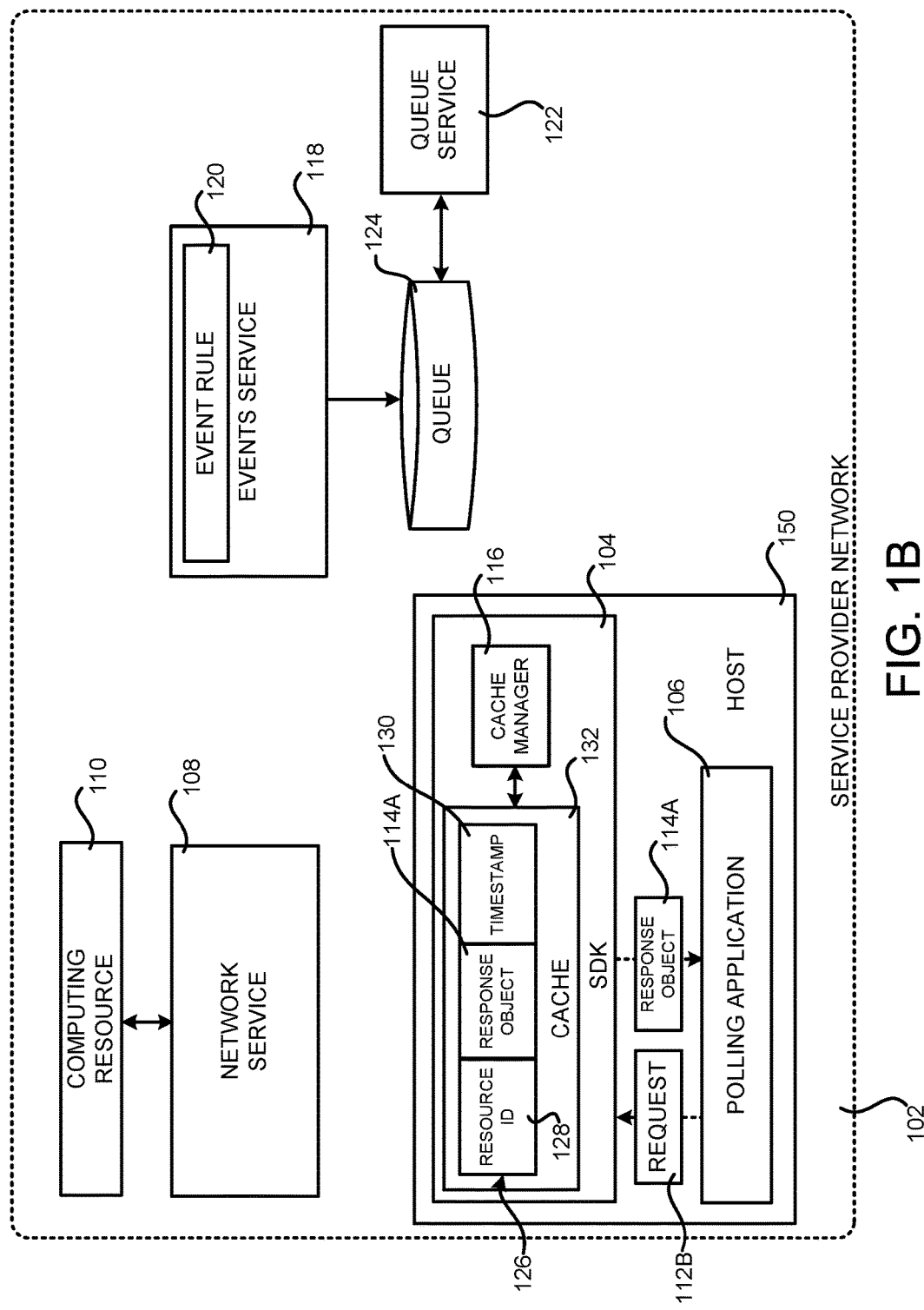

FIGS. 1A and 1B are computing system architecture diagrams showing aspects of the configuration and operation of a service provider network 102 that is configured to provide an SDK 104 for reducing unnecessary polling of a network service 108, according to one particular configuration. The service provider network 102 is a distributed network through which customers and/or other users can utilize computing resources 110, such as virtual machine ("VM") instances, data storage resources, and/or other types of computing resources, on a permanent or as-needed basis.

Each type or configuration of a computing resource 110 can be available from the service provider network 102 in different sizes. For example, a service provider can offer physical hosts, VM instances or other types of data processing resources that are available for purchase and use that have many different configurations of processor capabilities, main memory, disk storage, and operating system. A service provider operating the service provider network 102 can also offer other types of computing resources 110 for purchase and use by customers.

For example, and without limitation, the service provider network 102 can offer virtual or hardware devices, database resources and instances, file or block data storage resources, and/or networking resources, such as load balancing resources, domain name service ("DNS") resources, network services, virtual private cloud ("VPC") resources, virtual local area network ("VLAN") resources, and/or other types of hardware and software computing resources 110 on a permanent or as-needed basis. The computing resources 110 can also include, but are not limited to, VM instances and images, security groups, option groups, gateways, option sets, network access control lists ("ACLs"), subnets, storage buckets, network interfaces, snapshots, spot market requests, and storage volumes. As shown in FIG. 1A, a network service 108 executing in the service provider network 102 can provide the computing resources 110.

The service provider operating the service provider network 102 can also charge a fee for utilization of the computing resources 110 to a customer that creates and uses the computing resources 110. The fee charged for a particular computing resource 110 can be based upon the type and/or configuration of the computing resource 110. For example, in the case of a data processing computing resource 110, like a VM instance, the fee for use of the computing resource 110 can be charged based upon the amount of time the computing resource 110 is utilized. In the case of a data storage computing resource 110, the fee can be computed based upon the amount of data stored and/or the amount of data transferred into or out of the computing resource 110. The fees for other types of computing resources 110 can also be based upon other considerations. A service provider can also utilize various purchasing models to determine the amount to charge a customer for use of computing resources 110 provided by the service provider network 102, if any.

The computing resources 110 described above can be provided in one particular implementation by network services, such as the network service 108, executing in one or more data centers operated by the service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks ("WANs"), such as the Internet. Additional details regarding the configuration of a data center for implementing the functionality disclosed herein will be provided below with regard to FIGS. 5-8.

Some of the computing resources 110 described briefly above can also be provisioned and de-provisioned as needed in an automated fashion. For example, the service provider network 102 can be configured to instantiate a new instance of a computing resource 110, such as a VM instance, in response to an increase in demand for a network service or other condition. Other types of computing resources 110 can also be provisioned and de-provisioned in a similar manner. Network services, such as the network service 108 in the service provider network 102, can also provide functionality for automatically scaling and/or de-scaling some types of computing resources 110 based upon demand for the computing resources 110 and/or other factors.

A customer or potential customer of the service provider network 102 can utilize an appropriate computing system (not shown in FIG. 1) to communicate with the service provider network 102 over an appropriate data communications network (also not shown in FIG. 1). In this way, a customer of the service provider network 102 can configure various aspects of the operation of the computing resources 110 provided by the service provider network 102, or to otherwise control any computing resources 110 being utilized by the customer.

For example, and without limitation, a computing system utilized by a customer of the service provider network 102 (not shown in FIG. 1A) can be utilized to purchase certain types of computing resources 110 in the service provider network 102, to configure aspects of the operation of the computing resources 110 through a management console (not shown in FIG. 1A) or other type of interface, to access and utilize functionality provided by the various services and systems described herein, and/or to perform other types of functionality with regard to the operation of the computing resources 110 provided by the service provider network 102.

A customer computing system might be any type of computing device capable of connecting to the service provider network 102 via a suitable data communications network such as, but not limited to, a laptop or desktop computer, a smartphone or tablet computing device, a server computer, or a mobile telephone. Administrative users employed by the operator of the service provider network 102, such as administrators managing the operation of the service provider network 102, can also connect with, manage, and utilize computing resources 110 provided by the service provider network 102 in a similar fashion.

As discussed briefly above, the service provider network 102 can also be configured to provide various types of network services for use internally and by customers. For example, and without limitation, the service provider network 102 can provide an on-demand computing service for providing VM instances on-demand, a data storage service for storing data, a cryptography service, a database service, a notification service, an authentication service, a policy management service, and, potentially, other types of network-accessible services (not shown in FIG. 1A). The service provider network 102 can also provide an events service 118 and a queue service 122, which will be described in greater detail below, in some configurations. These and other services and their associated resources can be utilized together to implement various types of network-based applications in the service provider network 102. Additional details regarding one implementation of the service provider network 102 and the various types of network services that can be provided by the service provider network 102 will be discussed below with regard to FIGS. 5-8.

As shown in FIG. 1, a host 150 operates in the service provider network 102. The host 150 is a physical computing device, such as a server computer, or a virtual computing device, such as a VM. The host 150 is configured to execute a polling application 106. The polling application 106 is any type of program that is configured to poll a network service, such as the network service 108, to obtain information about a computing resource, such as the computing resource 110 which, in the example shown in FIG. 1A, is provided by the network service 108.

As also illustrated in FIG. 1A, the polling application 106 is configured to utilize the SDK 104 in order to poll the network service 108. As discussed briefly above, the SDK 104 is an SDK that facilitates utilization of network services executing in the service provider network 102, such as the network service 108. For example, the SDK 104 can expose functionality to the polling application 106 for serializing requests made to network services by the polling application and de-serializing responses received from the network services. The SDK 104 can also provide other types of functionality including, but not limited to, format conversion, encryption and decryption, providing APIs for accessing network services, managing transfers, and buffering. The SDK 104 can provide other types of functionality in other configurations.

The SDK 104 can also provide functionality for reducing unnecessary polling of a network service, such as the network service 108. In particular, the SDK 104 can receive a request 112A to poll the network service 108 in the service provider network 102 from the polling application 106. The request 112A might, for example, be a request to obtain information indicating the current state of the computing resource 110 provided by the network service 108. When the request 112A is received, the SDK 104 can determine if a response object 114A that describes the state of the computing resource 110 is contained in a cache 132 maintained by the SDK 104. If the response object 114A is stored in the cache 132, the SDK 104 can respond to the request 112A from the polling application 106 with the response object 114A stored in the cache 132 without polling the network service 108.

If, however, the response object 114A is not stored in the cache 132, the SDK 104 can poll the network service 108 to obtain the requested response object 114A. The SDK 104 can also create an entry 126 in the cache 132 that includes the response object 114A obtained from the network service 108. The entry 126 in the cache 132 can also contain other information including, but not limited to, a resource ID 128 that uniquely identifies the computing resource 110 and a timestamp 130 indicating the creation time of the entry 126.

If the response object 114A is not stored in the cache 132, the SDK 104 can also communicate with a network service executing in the service provider network 102 to create a destination for events relating to the computing resource 110. For example, and without limitation, a cache manager 116 process executing within the SDK 104 can communicate with a queue service 122 executing in the service provider network 102 in one configuration to create a queue 124 for storing events relating to the computing resource 110. Additionally, the cache manager 116 can communicate with an events service 118, also executing in the service provider network 102, to create an event rule 120. As discussed in greater detail below, the event rule 120 causes the events service 118 to place an event in the destination (e.g. the queue 124) when the state of the computing resource 110 changes. The SDK 104 then provides a reply to the request 112A that includes the response object 114A obtained from the network service 108.

As shown in FIG. 1B, when the SDK 104 receives a subsequent request 112B to poll the network service 108 from the polling application 106, the SDK 104 can determine whether the cache 132 contains the requested response object 114A. The SDK 104 might, for example, determine whether the cache 132 has an entry 126 containing the resource ID 128 of the computing resource 110. If the cache 132 contains the requested response object 114A, the SDK 104 can provide a reply to the request 112B containing the response object 114A without polling the network service 108. In this manner, unnecessary polling of the network service 108 is avoided. If, however, the response object 114A is not stored in the cache 132, the SDK 104 can poll the network service 108 for the response object 114A, store the response object 114A in the cache 132, and provide a reply to the request 112B with the response object 114A. Additional details regarding the mechanism shown in FIGS. 1A and 1B are provided below with regard to FIG. 2.

It is to be appreciated that, in some configurations, the cache 132 can be shared between multiple hosts 150 in some configurations. The cache 132 can also be stored on a host 150 or in another location accessible to all of the hosts 150 that utilize the cache 132. Each of the hosts 150 can update the cache 150 in the manner described herein.

Figure 2:
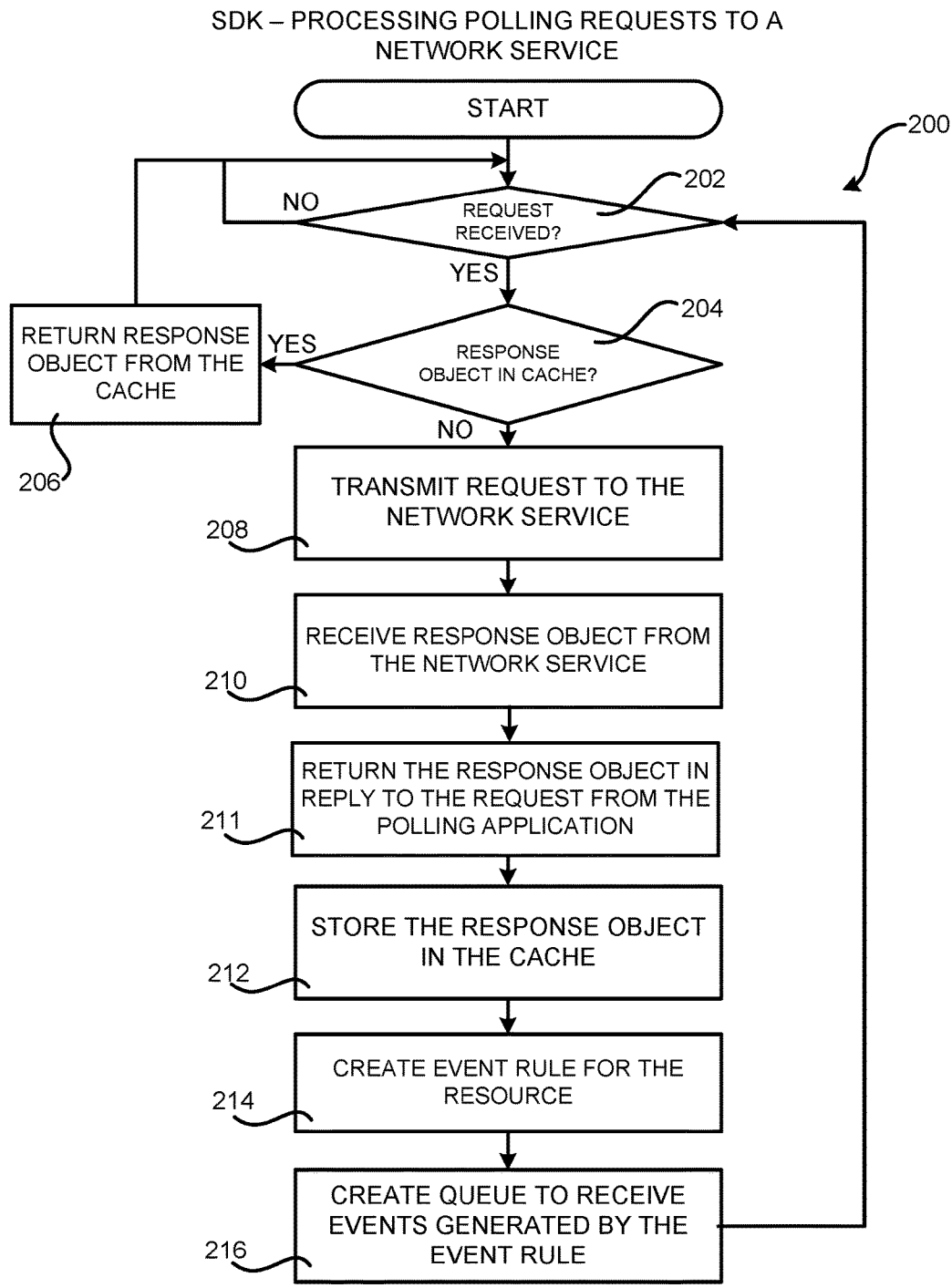
FIG. 2 is a flow diagram showing an illustrative routine that illustrates aspects of the operation of the SDK shown in FIGS. 1A and 1B that is configured to reduce unnecessary polling of a network service, according to one particular configuration.

FIG. 2 is a flow diagram showing an illustrative routine 200 that illustrates aspects of the operation of the SDK 104 shown in FIGS. 1A and 1B, which is configured to reduce unnecessary polling of the network service 108 in one particular configuration. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified herein.

The routine 200 begins at operation 202, where the SDK 104 determines whether the polling application 106 has submitted a polling request 112A to the SDK 104. If no polling request 112A has been received, the routine 200 proceeds back to operation 202 where another such determination can be made. If, however, the SDK 104 determines that a polling request 112A has been received from the polling application 106, the routine 200 proceeds from operation 202 to operation 204.

At operation 204, the SDK 104 determines if there is a response object 114A in the cache 132 for responding to the polling request 112A. As discussed above, the SDK 104 might, for example, compare a resource ID 128 for the computing resource 110 in the request 112A to the resource IDs 128 in the entries 128 in the cache 132. If there is a response object 114A in the cache 132 for responding to the polling request 112A, the routine 200 proceeds from operation 204 to operation 206, where the response object 114A stored in the cache 132 is returned in reply to the request 112A received at operation 202. The routine 200 then proceeds from operation 206 back to operation 202, which was described above.

If, at operation 204, the SDK 104 determines that there is not a response object 114A in the cache 132 for responding to the polling request 112A, the routine 200 proceeds from operation 204 to operation 208. At operation 208, the SDK 104 transmits the polling request 112A to the network service 108. The routine 200 then proceeds from operation 208 to operation 210, where the SDK 104 receives the response object 114A from the network service 108. From operation 210, the routine 200 proceeds to operation 211, where the SDK 104 returns the response object 114A obtained from the network service 108 at operation 210 to the polling application 106. The routine 200 then proceeds from operation 211 to operation 212.

At operation 212, the SDK 104 stores the response object 114A in the cache 132. In particular, and as discussed briefly above, the SDK 104 can create a new entry 126 in the cache 132 that includes the resource ID 128 for the computing resource 110, the response object 114A, and a timestamp 130 indicating the creation time of the entry 126.

From operation 212, the routine 200 proceeds to operation 214, where the cache manager 116 in the SDK 104 creates an event rule 120 using the events service 118. As discussed above, the event rule 120 can include the resource ID 128 of the computing resource 110 and the location of a destination (e.g. the queue 124) for storing events relating to the computing resource 110.

If creation of the event rule 120 fails for some reason, the event rule 120 will be created during the next polling cycle. In this manner, failure to create an event rule 120 will not impact the operation of the polling application 106.

The routine 200 then proceeds from operation 214 to operation 216, where the cache manager 116 also creates the destination for the events. For instance, in the example shown in FIGS. 1A and 1B, the cache manager 116 communicates with a queue service 122 executing in the service provider network 120 to create a queue 124 for storing the events. Other types of destinations can be utilized in other configurations such as, but not limited to, a serverless compute service function or a notification service.

A serverless compute service is a network service that allows users to execute code (which might be referred to herein as a "function") without provisioning or managing server computers in the service provider network 102. Rather, the serverless compute service can automatically run code in response to the occurrence of events. The code that is executed can be stored by the storage service 702B (described below) or in another network accessible location. In this regard, it is to be appreciated that the term "serverless compute service" as used herein is not intended to infer that servers are not utilized to execute the program code, but rather that the serverless compute service enables users to execute code without provisioning or managing server computers. The serverless compute service executes program code only when needed, and only utilizes the resources necessary to execute the code. In some configurations, the user or entity executing the code might be charged only for the amount of time required for each execution of their program code.

A notification service can be implemented by a collection of computing resources in the service provider network 102 collectively configured to provide a web service or other interface and an associated browser-based management console. The management console can be used to configure topics at the notification service for which customers seek to receive notifications, configure applications (or people), subscribe clients to the topics, publish messages, or configure delivery of the messages over clients' protocol of choice (i.e., HTTP), e-mail and short message service ("SMS"), among others. The notification service might also provide notifications to clients using a "push" mechanism without the need to periodically check or "poll" for new information and updates.

From operation 216, the routine 200 proceeds back to operation 202, where the process described above can be repeated. In this regard, it is to be appreciated that the operations 212, 214 and 216 can be performed in a different processing thread from the other operations shown in FIG. 2.

Figure 3:
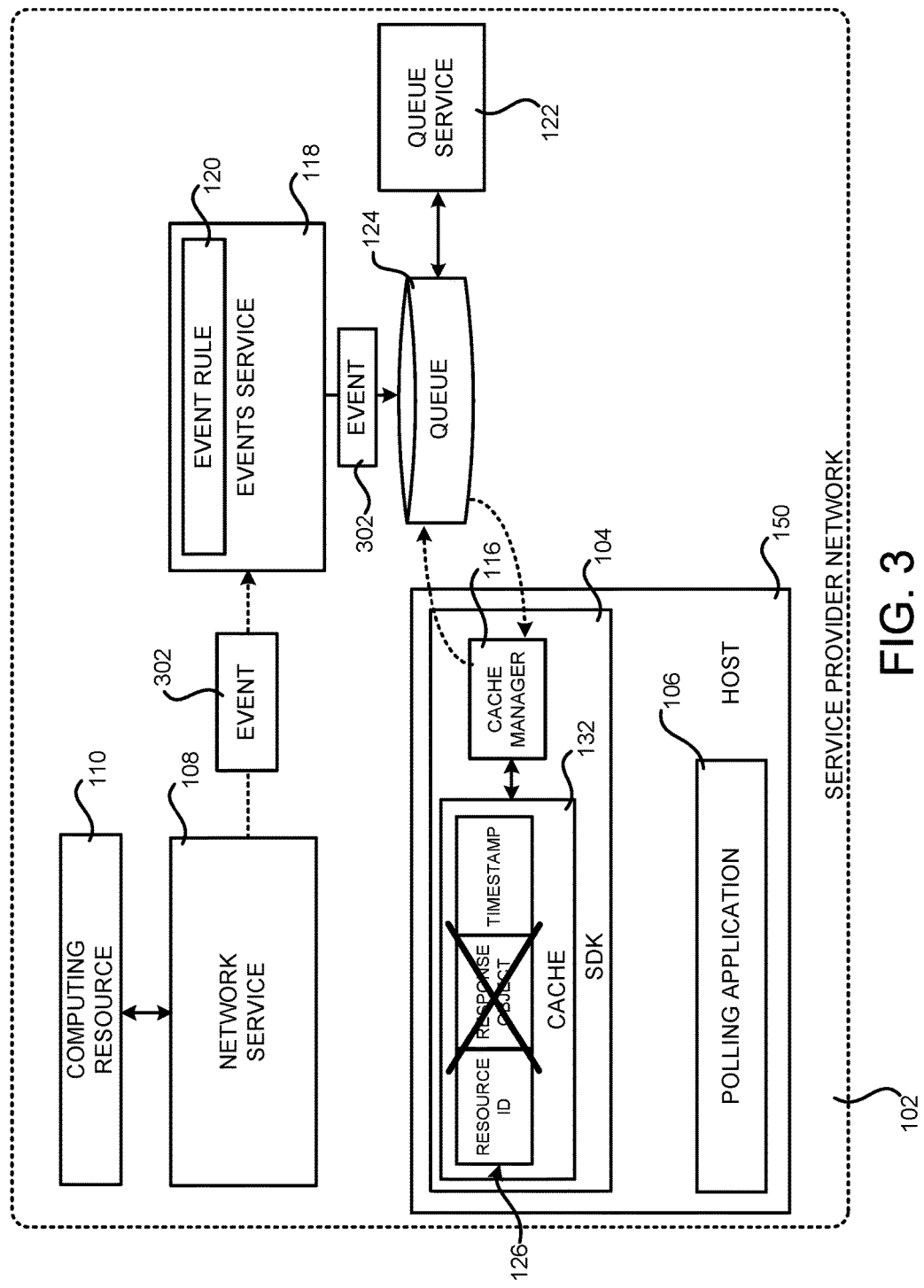
FIG. 3 is a system architecture diagram showing additional aspects of the operation of the SDK shown in FIGS. 1A and 1B that reduces unnecessary polling of a network service, according to one particular configuration.
Figure 4:
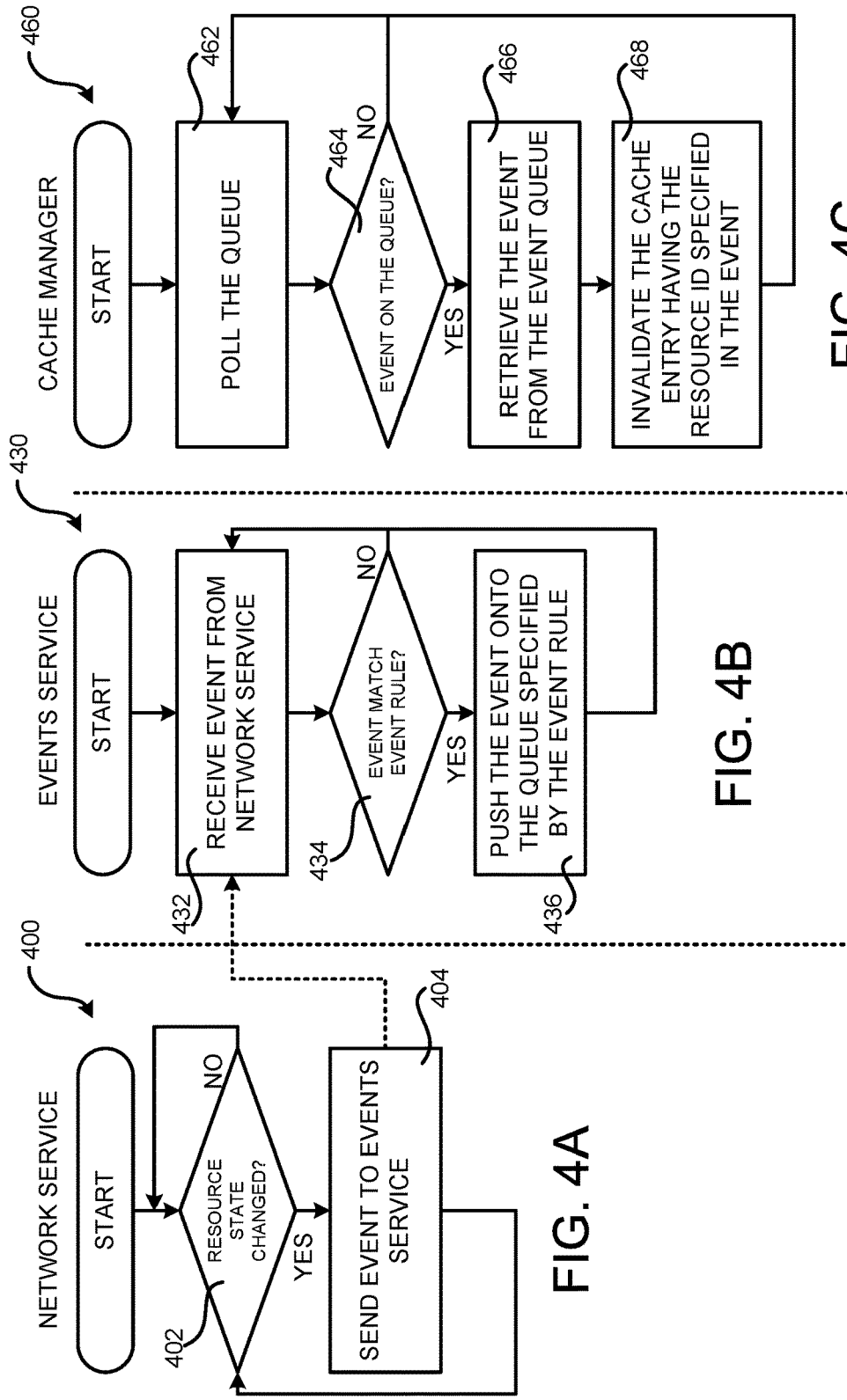
FIGS. 4A-4C are flow diagrams showing routines that illustrate additional aspects of the operation of a network service, an events service, and a cache manager, respectively, that operate in conjunction with the SDK shown in FIGS. 1A and 1B that reduces unnecessary polling of a network service, according to one particular configuration.

FIG. 3 is a system architecture diagram showing additional aspects of the operation of the SDK 104 shown in FIGS. 1A and 1B for reducing unnecessary polling of the network service 108, according to one particular configuration. As discussed briefly above, the network service 108 can also generate events, such as the event 302, to the events service 118 in response to determining that the state of the computing resource 110 has changed.

The events service 118 receives the event and determines if the event 118 matches an event rule 120. As discussed above, for example, the event 302 might specify the resource ID 128 for the computing resource 110. The event rule 120 can similarly specify the resource ID 128 for the computing resource 110. If the resource ID 128 in the event 302 matches the resource ID 128 in the event rule 120, the event service 118 will place the event 302 in the destination (e.g. the queue 124) specified by the event rule 120. The events service 118, the cache manager 116 in the SDK 104, or another service, can also delete the event rule 120 after a predetermined period of time has elapsed following the creation of the event rule 120.

The cache manager 116 executing in the SDK 104 can also periodically poll the destination (e.g. communicate with the queue service 122 to determine the content of the queue 124) to determine if an event 302 corresponding to the computing resource 110 has been stored in the destination. If such an event 302 has been stored in the destination (e.g. placed on the queue 124), the cache manager 116 executing in the SDK 104 will retrieve the event 302 from the destination (e.g. dequeue the event 302 from the queue 124) and invalidate (e.g. delete) the entry 126 in the cache 132 that includes the response object 114A.

In this manner, entries 126 in the cache 132 can be invalidated when the state of the corresponding computing resource 110 changes. This will cause the SDK 132 to poll the network service 108 for updated information (i.e. an updated response object 114) regarding the computing resource 110 the next time the polling application 106 submits a polling request 112. The cache manager 116 executing in the SDK 104 can also invalidate entries 126 in the cache 132 based upon the timestamp 130 contained in the entries 126. For example, entries 126 that are more than a predetermined period of time old can be deleted from the cache 132. Additional details regarding this process are provided below with regard to FIGS. 4A-4C.

FIGS. 4A-4C are flow diagrams showing routines 400, 430, and 460, that illustrate additional aspects of the operation of the network service 108, the events service 118, and the cache manager 116, respectively, that operate in conjunction with the SDK 104 shown in FIGS. 1A and 1B for reducing unnecessary polling of a network service 108, according to one particular configuration. The routines 400, 430, and 460 will be described separately below.

The routine 400 begins at operations 402, where the network service 108 determines whether the state of the computing resource 110 has changed. If the state of the computing resource 110 has not changed, the routine 400 proceeds back to operation 402, where another such determination can be made.

If, at operation 402, the network service 108 determines that the state of the computing resource 110 has changed, the routine 400 proceeds from operation 402 to operation 404. At operation 404, the network service 108 transmits an event 302 to the events service 118. As discussed above, the event 302 can include the resource ID 128 of the computing resource 110. The event 302 can also include other information, such as the content of the response object 114 for the computing resource 110. The routine 400 proceeds from operation 404 back to operation 402, where the operations described above can be repeated.

The routine 430 begins at operation 432, where the events service 118 receives the event 302 from the network service 108. The routine 430 then proceeds from operation 432 to operation 434, where the events service 118 determines if the event 302 matches the event rule 120. This can be accomplished, for example, by comparing the resource ID 128 in the event 302 to the resource ID 128 in the event rule 120. If the event 302 does not match the event rule 120, the routine 430 proceeds back to operation 432, where another event 302 can be received.

If the event 302 matches the event rule 120, the routine 430 proceeds from operation 434 to operation 436. At operation 436, the events service 118 stores the event 302 in the destination specified by the event rule 120. For example, and without limitation, the events service 118 can store the event 302 in the queue 124 maintained by the queue service 122 in one configuration. The routine 430 then proceeds back to operation 432, where another event 302 can be received and processed in the manner described above.

The routine 460 begins at operation 462, where the cache manager 116 periodically polls the destination (e.g. the queue 124) to determine if an event 302 has been stored in the destination. If an event 302 has not been stored in the destination (e.g. the queue 124), the routine 460 returns to operation 462, where the cache manager 116 can poll the destination again. If, however, an event 302 has been stored in the destination, the routine 460 proceeds from operation 464 to operation 466.

At operation 466, the cache manager 116 retrieves the event 302 from the destination (e.g. dequeues the event 302 from the queue 124). The routine 460 then proceeds from operation 466 to operation 468, where the cache manager invalidates the entry 126 in the cache 132 having the same resource ID 128 as that specified in the event 302. The routine 460 then proceeds back to operation 462, where another event 302 can be received and processed in the manner described above.

It is to be appreciated that, in some configurations, the SDK 104 can poll the network service 108 in a traditional fashion when the number of requests 112 is below a predefined threshold number of requests 112. If the number of polling requests 112 exceeds the predefined threshold, however, the SDK 104 can transition to utilize the mechanism described herein whereby the number of unnecessary polling operations is reduced. If the number of requests 112 falls back below the threshold, the SDK 104 can return to polling the network service 108 in the traditional fashion. In this way, the mechanism disclosed herein can be utilized only when it will result in computational efficiency as compared to the use of a traditional polling mechanism. The mechanism disclosed herein will not be utilized when conventional polling would be more efficient.

Figure 5:
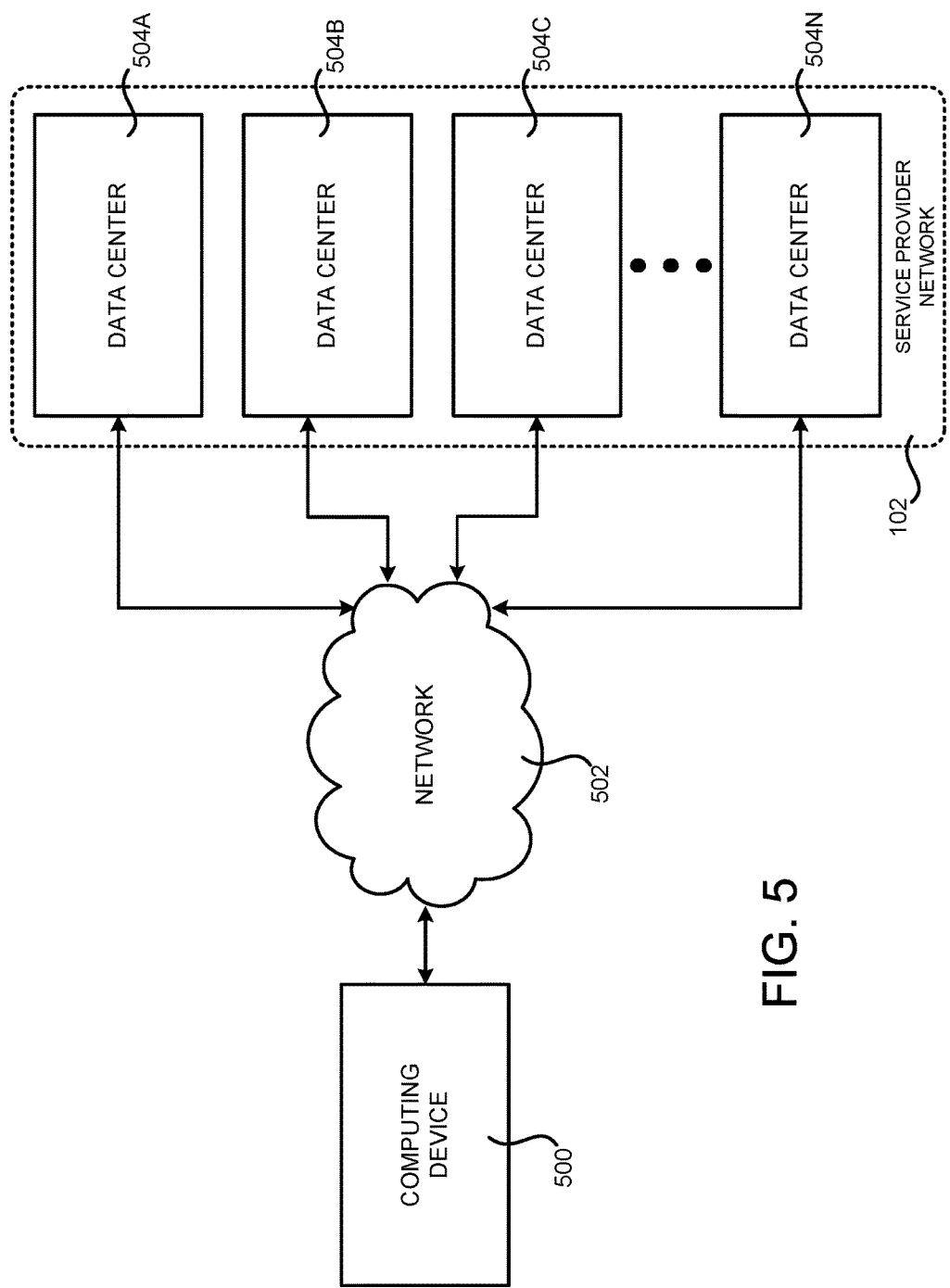
FIG. 5 is a system and network diagram that shows an illustrative operating environment that includes a service provider network that can be configured to implement aspects of the functionality described herein.

FIG. 5 is a system and network diagram that shows one illustrative operating environment for the configurations disclosed herein that includes a service provider network 102 that can be configured to implement the SDK 104, the network service 108, the events service 118, and the queue service 122. As discussed above, the service provider network 102 can provide computing resources 110, like VM instances and storage, on a permanent or an as-needed basis. Among other types of functionality, the computing resources 110 provided by the service provider network 102 can be utilized to implement the various components described above. As also discussed above, the computing resources 110 provided by the service provider network 102 can include various types of computing resources 110 such as, but not limited to, data processing resources like VM instances, data storage resources, networking resources, data communication resources, network services, and other types of resources.

Each type of computing resource 110 provided by the service provider network 102 can be available in a number of specific configurations. For example, data processing resources can be available as physical computers or VM instances in a number of different configurations. The VM instances can be configured to execute applications, including web servers, application servers, media servers, database servers, the polling application 106, some or all of the services described above, and/or other types of programs. Data storage resources can include file storage devices, block storage devices, and the like. The service provider network 102 can also be configured to provide other types of computing resources 110 not mentioned specifically herein.

The computing resources 110 provided by the service provider network 102 are enabled in one implementation by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

The customers and other users of the service provider network 102 can access the computing resources 110 provided by the service provider network 102 over a network 502, which can be a wide area communication network ("WAN"), such as the Internet, an intranet or an Internet service provider ("ISP") network or a combination of such networks. For example, and without limitation, a computing device 500 operated by a customer or other user of the service provider network 102 can be utilized to access the service provider network 102 by way of the network 502. It should be appreciated that a local-area network ("LAN"), the Internet, or any other networking topology known in the art that connects the data centers 504 to remote customers and other users can be utilized. It should also be appreciated that combinations of such networks can also be utilized.

Figure 6:
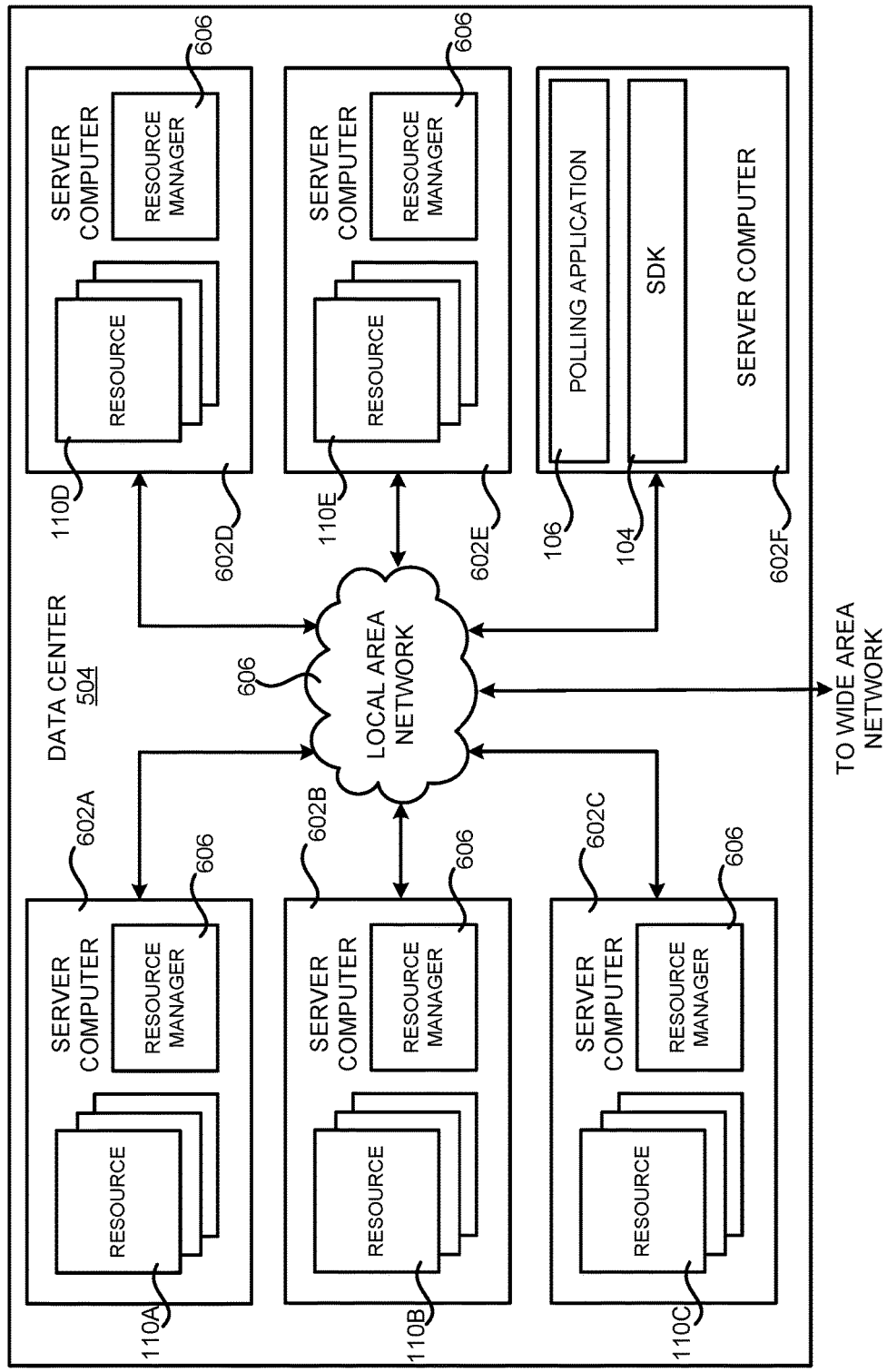
FIG. 6 is a computing system diagram illustrating a configuration for a data center that can be utilized to implement aspects of the technologies disclosed herein.

FIG. 6 is a computing system diagram that illustrates one configuration for a data center 504 that can implement the technologies disclosed herein. The example data center 504 shown in FIG. 6 includes several server computers 602A-602F (which might be referred to herein singularly as "a server computer 602" or in the plural as "the server computers 602") for providing computing resources 110A-110E.

The server computers 602 can be standard tower, rackmount, or blade server computers configured appropriately for providing the computing resources 110 described herein (illustrated in FIG. 6 as the computing resources 110A-110E). As mentioned above, the computing resources 110 provided by the service provider network 102 can be data processing resources such as VM instances or hardware computing systems, computing clusters, data storage resources, database resources, networking resources, and others. Some of the servers 602 can also be configured to execute a resource manager 606 capable of instantiating and/or managing the computing resources 110. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 7.

The data center 504 shown in FIG. 6 also includes a server computer 602F that can execute some or all of the software components described above. For example, and without limitation, the server computer 602F can be configured to execute the polling application 106 and the SDK 104. The server computer 602F can also be configured to execute other components and/or to store data for providing some or all of the functionality described herein. In this regard, it should be appreciated that the components illustrated in FIG. 6 as executing on the server computer 602F can execute on many other physical or virtual servers in the data centers 504 in various configurations.

In the example data center 504 shown in FIG. 6, an appropriate LAN 606 is also utilized to interconnect the server computers 602A-602F. The LAN 606 is also connected to the network 502 illustrated in FIG. 5. It should be appreciated that the configuration and network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 504A-504N, between each of the server computers 602A-602F in each data center 504, and, potentially, between computing resources in each of the data centers 504. It should be appreciated that the configuration of the data center 504 described with reference to FIG. 6 is merely illustrative and that other implementations can be utilized.

Figure 7:
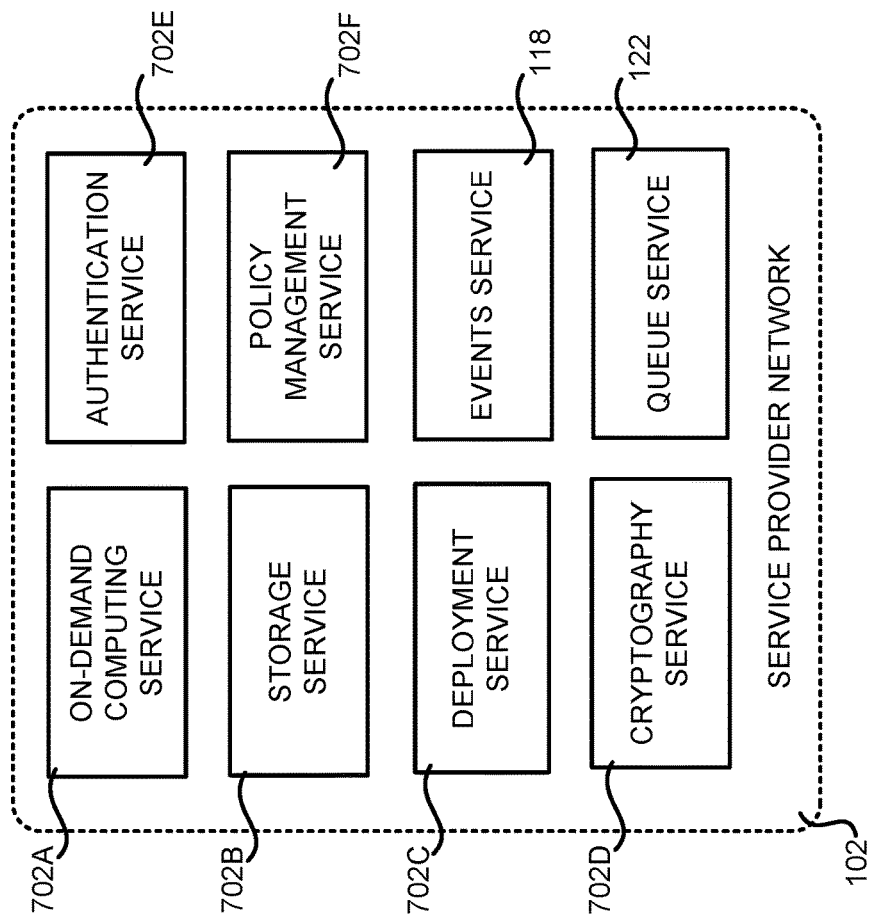
FIG. 7 is a system and network diagram that shows aspects of several services that can be provided by and utilized within a service provider network in one configuration disclosed herein.

FIG. 7 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the network service 108, the events service 118, and the queue service 122, which were described in detail above.

The service provider network 102 can also provide other types of services including, but not limited to, an on-demand computing service 702A, a storage service 702B, a deployment service 702C, a cryptography service 702D, an authentication service 702E, and/or a policy management service 702F, some of which are described in greater detail below. Additionally, the service provider network 102 can also provide other services, some of which are also described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 502 shown in FIG. 5. Communications from a customer computing device, such as the computing device 500 shown in FIG. 5, to the service provider network 102 can cause the services provided by the service provider network 102 to operate in accordance with the described configurations or variations thereof.

It is noted that not all configurations described include the services described with reference to FIG. 7 and that additional services can be provided in addition to or as an alternative to services explicitly described. Each of the services shown in FIG. 7 can also expose web service interfaces that enable a caller to submit appropriately configured API calls to the various services through web service requests. In addition, each of the services can include service interfaces that enable the services to access each other (e.g., to enable a virtual computer system provided by the on-demand computing service 702A to store data in or retrieve data from the data storage service 702B). Additional details regarding some of the services shown in FIG. 7 will now be provided.

As discussed above, the on-demand computing service 702A can be a collection of computing resources configured to instantiate VM instances and to provide other types of computing resources on demand. For example, a customer or other user of the service provider network 102 can interact with the on-demand computing service 702A (via appropriately configured and authenticated API calls) to provision and operate VM instances that are instantiated on physical computing devices hosted and operated by the service provider network 102. The VM instances can be used for various purposes, such as to operate as servers supporting a web site, to operate business applications, to execute the polling application 106 or, generally, to serve as computing resources for the customer. Other applications for the VM instances can be to support database applications, electronic commerce applications, business applications and/or other applications. Although the on-demand computing service 702A is shown in FIG. 7, any other computer system or computer system service can be utilized in the service provider network 102, such as a computer system or computer system service that does not employ virtualization and instead provisions computing resources on dedicated or shared computers/servers and/or other physical devices.

The storage service 702B can include software and computing resources that collectively operate to store data using block or file-level storage devices (and/or virtualizations thereof). The storage devices of the storage service 702B can, for instance, be operationally attached to virtual computer systems provided by the on-demand computing service 702A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 702D. The cryptography service 702D can utilize storage services of the service provider network 102, such as the storage service 702B, to store encryption keys in encrypted form, whereby the keys are usable to decrypt customer keys accessible only to particular devices of the cryptography service 702D. The cryptography service 702C can also provide other types of functionality not specifically mentioned herein.

As illustrated in FIG. 7, the service provider network 102, in various configurations, also includes an authentication service 702E and a policy management service 702F. The authentication service 702E, in one example, is a computer system (i.e., collection of computing resources 110) configured to perform operations involved in authentication of users. For instance, one of the services 702 shown in FIG. 7 can provide information from a user to the authentication service 702E to receive information in return that indicates whether or not the requests submitted by the user are authentic.

The policy management service 702F, in one example, is a network service configured to manage policies on behalf of customers or internal users of the service provider network 102. The policy management service 702F can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services based, at least in part, on the needs of its customers. For instance, the service provider network 102 can maintain a deployment service 702C for deploying program code and/or a database service (not shown in FIG. 7) in some configurations. A database service can be a collection of computing resources that collectively operate to create, maintain, and allow queries to be performed on databases stored within the service provider network 102.

For example, a customer or other user of the service provider network 102 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 102 can also be configured with other services not specifically mentioned herein in other configurations.

Figure 8:
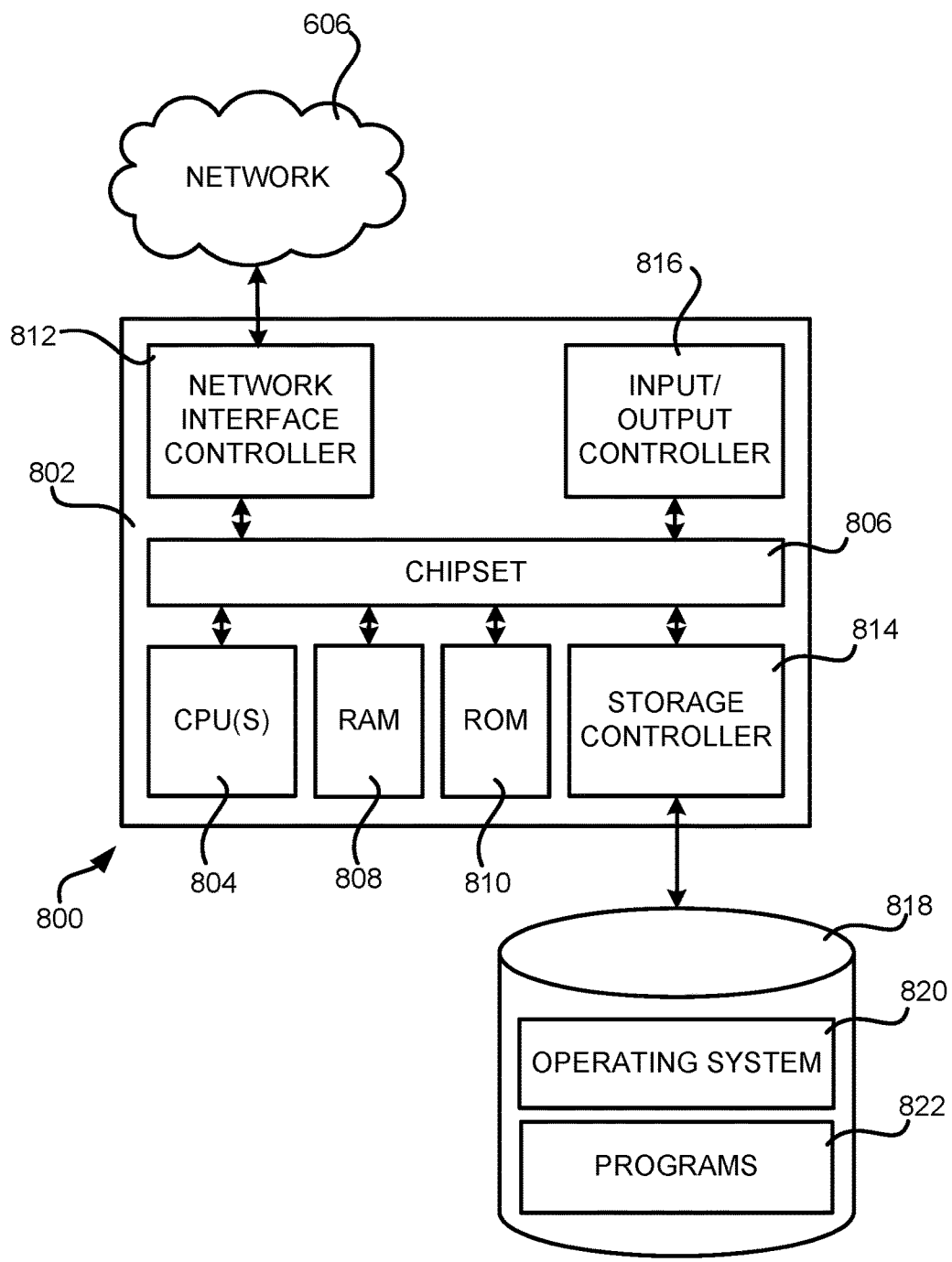
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 606. The chipset 806 can include functionality for providing network connectivity through a NIC 812, such as a gigabit Ethernet adapter. The NIC 812 is capable of connecting the computer 800 to other computing devices over the network 606. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In one configuration, the mass storage device 818 or other computer-readable storage media is encoded with computer-executable instructions which, when loaded into the computer 800, transform the computer into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-4. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, a plotter, or other type of output device. It will be appreciated that the computer 800 might not include all of the components shown in FIG. 8, can include other components that are not explicitly shown in FIG. 8, or might utilize an architecture completely different than that shown in FIG. 8.

Based on the foregoing, it should be appreciated that an SDK 104 for reducing unnecessary polling of network services 108 has been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
   at least one processor; and
   at least one non-transitory computer-readable storage medium having instructions stored thereupon that are executable by the processor and which, when executed, cause the system to:
      receive a request at a software development kit (SDK) from an application executing on a host in a service provider network to poll a network service in the service provider network to determine a state of a computing resource provided by the network service, the computing resource comprising at least one of a virtual machine or a data storage resource;
      determine that a response object is absent from a cache that describes the state of the computing resource; and
      based at least in part on determining that the response object is absent from the cache:
         poll the network service to obtain the response object,
         provide a reply to the request, the reply including the response object,
         create an entry in the cache, the entry including the response object,
         communicate with a queue service executing in the service provider network to create a queue,
         communicate with an events service executing in the service provider network to create an event rule that will cause, based at least in part on a change associated with the state of the computing resource, an event to be placed on the queue, and
         cause the SDK to delete the queue after a predetermined period of time has elapsed.

2. The system of claim 1, wherein the at least one non-transitory computer-readable storage medium has further instructions stored thereupon to:
   poll the queue to determine that an event corresponding to the computing resource has been placed on the queue; and
   dequeue the event from the queue, and
   invalidate the entry in the cache that includes the response object.

3. The system of claim 1, wherein the network service is configured to provide an event to the events service responsive to the state of the computing resource provided by the network service changes.

4. The system of claim 3, wherein the events service is configured to:
   receive the event from the network service;
   determine that the event matches the event rule; and
   place the event on the queue.

5. The system of claim 1, wherein the entry in the cache comprises the response object, an identifier for the computing resource, and a timestamp.

6. The system of claim 5, wherein the at least one non-transitory computer-readable storage medium has further instructions stored thereupon to invalidate the entry in the cache that includes the response object based upon the timestamp.

7. A non-transitory computer-readable storage medium having computer executable instructions stored thereupon which, when executed by a system, cause the system to:
   receive a request at a software development kit (SDK) to poll a network service to determine a state of a computing resource, the computing resource comprising at least one of a virtual machine or a data storage resource;
   determine that a response object is absent from a cache that describes the state of the computing resource;
   poll the network service to obtain the response object;
   provide a reply to the request that includes the response object;
   create an entry in the cache that includes the response object;
   cause a queue service to create a queue;
   cause an events service to create an event rule that will cause, based at least in part on a change associated with the state of the computing resource, an event to be placed on the queue;
   determine that a period of time has elapsed; and
   cause, based at least in part on determining that the period of time has elapsed, the SDK to delete the queue.

8. The non-transitory computer-readable storage medium of claim 7, wherein the change is received from the network service.

9. The non-transitory computer-readable storage medium of claim 7, having further computer executable instructions stored thereupon to:
   poll the queue to determine that an event for the computing resource has been placed on the queue; and
   dequeue the event from the queue, and
   invalidate the entry in the cache that includes the response object.

10. The non-transitory computer-readable storage medium of claim 7, wherein the network service is configured to provide an event to the events service responsive to determining that the state of the computing resource provided by the network service has changed.

11. The non-transitory computer-readable storage medium of claim 10, wherein the events service is configured to:
receive the event from the network service;
determine that the event matches the event rule; and
place the event on the queue.

12. The non-transitory computer-readable storage medium of claim 7, wherein the entry in the cache comprises the response object, an identifier for the computing resource, and a timestamp, and wherein the non-transitory computer-readable storage medium has further instructions stored thereupon to invalidate the entry in the cache that includes the response object based upon the timestamp.

13. The non-transitory computer-readable storage medium of claim 7, wherein the events service is configured to delete the event rule after the period of time has elapsed following creation of the event rule.

14. A computer-implemented computer implemented method, comprising:
receiving a request at a software development kit (SDK) to poll a network service for information about a computing resource, the computing resource comprising at least one of a virtual machine or a data storage resource;
responsive to receiving the request, determining that a response object is absent from a cache that includes the information;
polling the network service to obtain the response object;
creating an entry in the cache that includes the response object;
causing a destination to be created for receiving events relating to the computing resource;
causing an event rule to be created for placing an event in the destinatio responsive to a change of the information about the computing resource;
providing a reply to the request that includes the response object; and
causing the SDK to delete the destination after a predetermined period of time has elapsed.

15. The computer-implemented method of claim 14, wherein the destination comprises a queue provided by a queue service executing in a service provider network.

16. The computer-implemented method of claim 14, wherein the destination comprises a serverless compute service function.

17. The computer-implemented method of claim 14, wherein the destination is provided by a notification service.

18. The computer-implemented method of claim 14, wherein the change of the information about the computing resource is received from the network service.

19. The computer-implemented method of claim 14, wherein the network service is configured to provide the event to an events service responsive to determining that the information about the computing resource has changed, and wherein the events service is configured to:
receive the event from the network service;
determine that the event matches the event rule; and
place the event in the destination.

20. The computer-implemented method of claim 19, wherein the events service is further configured to delete the event rule after the predetermined period of time has elapsed following creation of the event rule, and wherein the method further comprises deleting the destination.

* * * * *